(12) United States Patent
Pearson et al.

(10) Patent No.: US 7,272,276 B2
(45) Date of Patent: Sep. 18, 2007

(54) OPTICAL PERFORMANCE MONITOR

(75) Inventors: Matt Pearson, Ottawa (CA); Lynden Erickson, Cumberland (CA); John Miller, Ottawa (CA); Siegfried Janz, Ottawa (CA); Dan-Xia Xu, Gloucester (CA); Pavel Cheben, Ottawa (CA); Andre Delage, Gloucester (CA); Boris Lamontagne, Ottawa (CA); Sylvain Charbonneau, Cumberland (CA)

(73) Assignee: Enablence Inc., Kanata, Ontario (CA)

( * ) Notice: Subject to any disclaimer, the term of this patent is extended or adjusted under 35 U.S.C. 154(b) by 1359 days.

(21) Appl. No.: 09/986,479

(22) Filed: Nov. 8, 2001

(65) Prior Publication Data

US 2003/0048498 A1 Mar. 13, 2003

(30) Foreign Application Priority Data

Sep. 12, 2001 (CA) .................................... 2357226

(51) Int. Cl.
*G02B 6/28* (2006.01)
*G02B 6/26* (2006.01)
*G02B 6/42* (2006.01)
*G02B 6/34* (2006.01)

(52) U.S. Cl. ............................ 385/24; 385/15; 385/31; 385/37; 385/39; 385/44; 385/45; 385/46

(58) Field of Classification Search .................. 385/15, 385/24, 31, 37, 39, 44–46
See application file for complete search history.

(56) References Cited

U.S. PATENT DOCUMENTS

| 4,430,572 | A | 2/1984 | Eve et al. |
| 6,351,583 | B1* | 2/2002 | Bergmann et al. ............ 385/24 |
| 6,826,331 | B2* | 11/2004 | Barwicz et al. ............... 385/37 |

| 2002/0191887 | A1* | 12/2002 | Bidnyk .......................... 385/15 |
| 2004/0228602 | A1* | 11/2004 | Livas et al. .................. 385/140 |

FOREIGN PATENT DOCUMENTS

| EP | 0 703 679 A2 | 3/1996 |
| FR | 2 764 376 A1 | 12/1998 |
| WO | WO92/11516 | 7/1992 |
| WO | WO 01/18577 A1 | 3/2001 |

OTHER PUBLICATIONS

Jian-Jun He et al., "Monolithic Integrated Wavelength Demultiplexer Based on a Wavelength Rowland Circle Grating in InGaAsP/InP", Journal of Lightwave Technology, vol. 16, No. 4, Apr. 1998, pp. 631-638.*
K.R. Poguntke, et al., "High-performance InP reflection-grating wavelength multiplexer", Electronics Letters, Mar. 1994, vol. 30, No. 6, pp. 512-513.
M. Teshima, et al., "Multiwavelength simultaneous monitoring circuit employing crossover properties of arrayed-waveguide grating", Electronics Letters, Aug. 1995, vol. 31, No. 18, pp. 1595-1597.

* cited by examiner

*Primary Examiner*—Brian Healy
*Assistant Examiner*—Jerry Martin Blevins
(74) *Attorney, Agent, or Firm*—Teitelbaum & MacLean; Neil Teitelbaum; Doug MacLean

(57) ABSTRACT

An optical performance monitor for measuring the performance of optical networks has an echelle grating for demultiplexing an input beam into a plurality of wavelengths that are focused onto an array of divided output waveguides. Each divided output waveguide is positioned to receive a corresponding demultiplexed wavelength from the echelle grating or other waveguide multiplexer device. The divided output waveguides laterally separate the corresponding demultiplexed wavelength into a first and second portions. A detector array is positioned to receive the respective portions of the demultiplexed wavelengths and by comparing their relative intensity it is possible to detect any drift in the nominal wavelengths of the channels.

19 Claims, 3 Drawing Sheets

OPTICAL PERFORMANCE MONITOR

BACKGROUND OF THE INVENTION

1. Field of the Invention

This invention relates to the field of photonics, and in particular to a monitor for monitoring the performance of photonic devices in an optical network, such as demultiplexers employed in wavelength division multiplexing. The monitor can, for example, accurately measure the power, wavelength, and ONSR (Optical Signal-to-Noise Ratio) for each channel.

2. Description of Related Art

Telecommunications carriers have a need to monitor the performance of optical transport networks. For example, light will often undergo a slight wavelength shift as light source (typically a semiconductor laser) ages and starts to fail. The telecommunications carriers need to be able to monitor this.

A number of manufacturers offer monitoring devices, but none is capable of effectively monitoring channel power, wavelength, and OSNR, and yet at the same time have a small footprint without moving parts and be scaleable. Prior art devices also have limited channel capacity. For example, Kymata Ltd. offers a DWDM Power Monitor that is suitable for active monitoring of optical power levels within a DWDM system. However, this device, which uses AWG (Arrayed Waveguide Grating) technology is not capable of monitoring wavelength or OSNR and is limited to 40 channels. AWG technology has poor scaleability.

SUMMARY OF THE INVENTION

According to the present invention there is provided an optical performance monitor for measuring the performance of optical networks, comprising a demultiplexer for demultiplexing an input beam into a plurality of wavelengths; an array of divided output waveguides, each divided output waveguide positioned to receive a corresponding demultiplexed wavelength from said demultiplexer, and each divided output waveguide laterally separating said corresponding demultiplexed wavelength into a first portion and a second portion; and a detector array having sensor elements positioned to receive said respective first and second portions of said demultiplexed wavelengths.

The demultiplexer is preferably an echelle grating, such as a planar waveguide planar echelle grating, but it could be another demultiplexing device, such as an arrayed waveguide grating, for example. It will be understood that the expression "echelle grating" extends to any "staircase" type grating with staggered facets, including echelon gratings.

The input beam is typically a light beam generated by a laser. It will of course be understood by one skilled in the art that the term "light" in this specification is not limited to light in the visible spectrum.

Directing the demultiplexed wavelengths onto the divided waveguides enables the monitor to be made very sensitive to drift. If the demultiplexed wavelengths have their nominal values, they would typically fall onto the mid-point of the divided output waveguides so that each wavelength is split evenly into the two portions. In the event of drift, the light is no longer split evenly, and by measuring the difference between the outputs of the elements associated with the two portions, very small changes in wavelength can be detected.

The use of undivided waveguides between the divided waveguides allows the measurement of OSNR since the undivided waveguides permit measurement of the background noise.

The echelle grating is preferably a blazed Rowland grating which focuses the demultiplexed wavelengths onto the divided output waveguides.

The output waveguides are preferably ridge waveguides formed by lithography on a substrate also providing a slab waveguide to couple said output waveguides to said echelle grating.

The optical performance monitor can typically measure power, wavelength and OSNR for each channel of an 80 channel system with 50 GHz spacing. Other examples would be 40 channels at 100 GHz spacing, and 160 channels at 25 GHz spacing.

In another aspect the invention provides an optical channel monitor comprising a demultiplexer for receiving a beam of incoming light and demultiplexing said incoming light into a plurality of wavelengths; an array of output waveguides, each output waveguide positioned to received a corresponding demultiplexed wavelength from said demultiplexer; and a detector array having sensor elements positioned to receive said respective demultiplexed wavelengths.

While as sensitive to drift such a channel monitor is suitable for measuring the power in the WDM channels, and has considerable advantages over the prior art, particularly with regard to scaleability.

The invention also provides a method of monitoring the performance of an optical network, comprising the steps of demultiplexing an input beam into a plurality of wavelengths; receiving said demultiplexed wavelengths in divided output waveguides, said output waveguides separating said demultiplexed wavelengths into laterally spaced portions; and detecting the relative intensity of said laterally spaced portions to determine the drift of said demultiplexed wavelengths from nominal values

BRIEF DESCRIPTION OF THE DRAWINGS

The invention will now be described in more detail, by way of example only, with reference to the accompanying drawings, in which.

Figure 1:
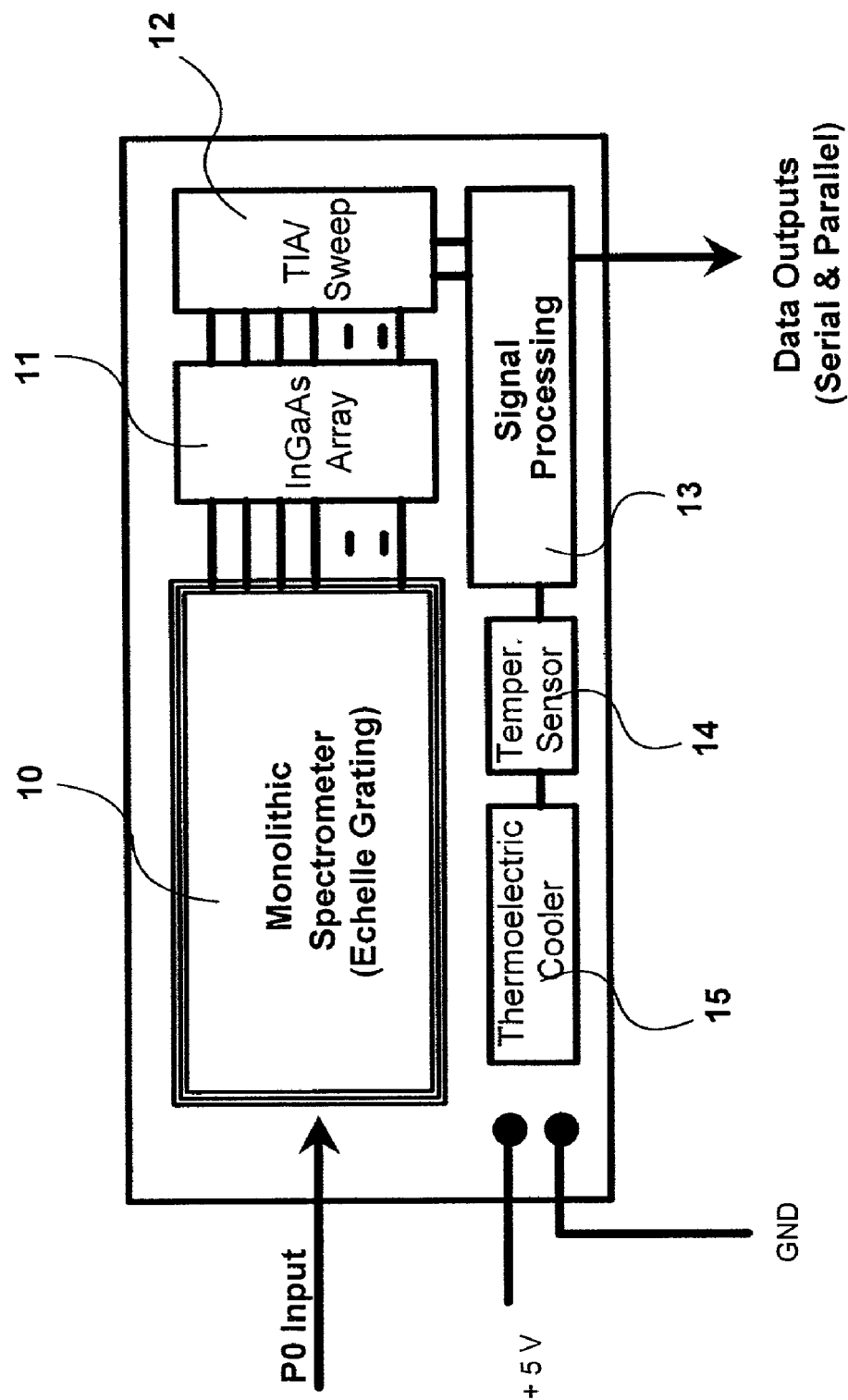
FIG. 1 is a block diagram of an optical performance monitor.

The optical performance monitor shown in FIG. 1 comprises a monolithic spectrometer 10, which will be described in more detail below, an InGaAs array detector 11, a sweep circuit 12, and a signal processing circuit 13. The signal processing circuit 16 has serial and parallel data outputs.

A temperature sensor 14 monitors the temperature of the device, and a constant temperature at a nominal value is maintained with the aid of thermoelectric cooler 15.

Figure 2:
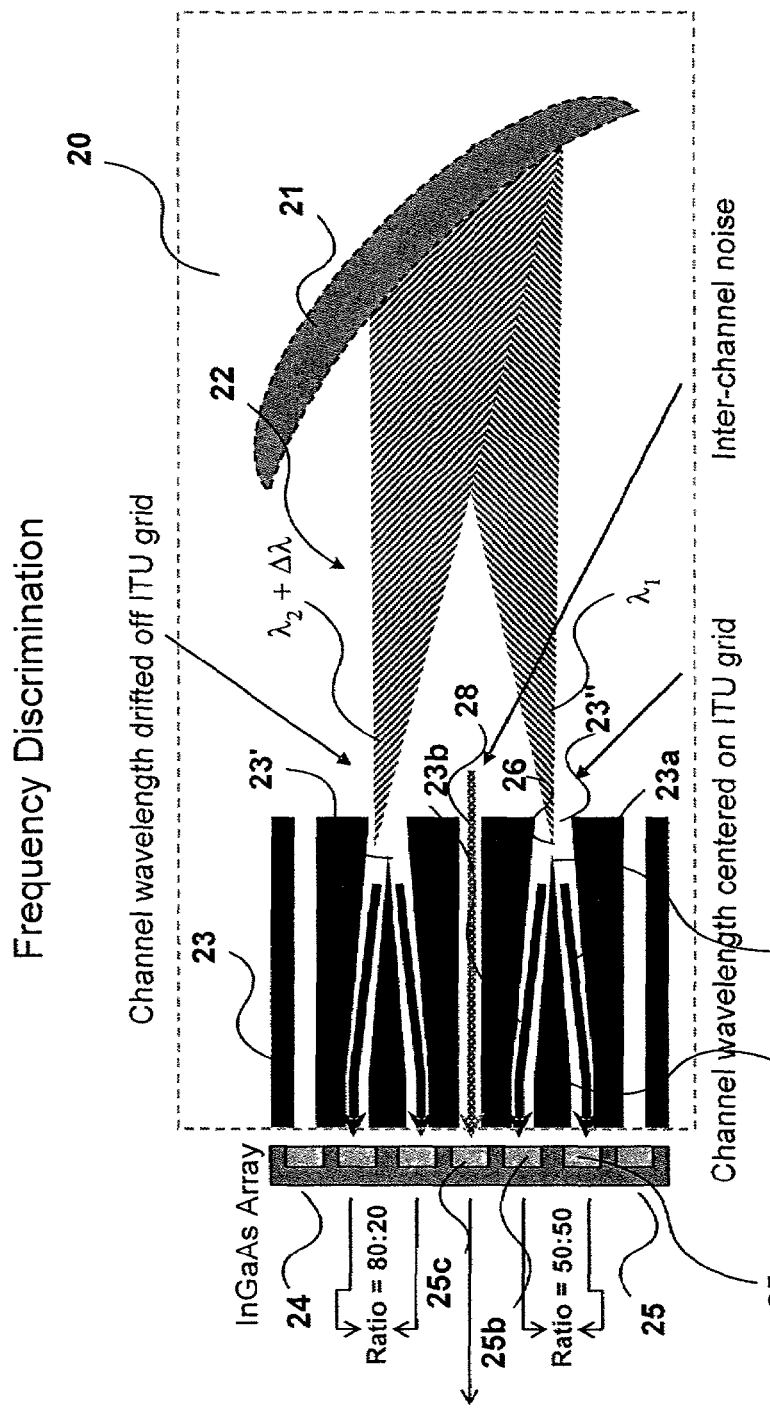
FIG. 2 is a schematic plan view of the spectrometer demultiplexer.

The spectrometer 10 is shown in more detail in FIG. 2. This is a monolithic device formed on a glass substrate having etched therein a Rowland circle blazed echelle grating 21. A Rowland grating is described, for example, in the article Planar Rowland Spectrometer for fiber-optic Wavelength Demultiplexing, H. W. Yen, H. R. Friedrich, R. J. Morrison, and G. L. Tangonan, December 1981, Vol. 6, No. 12, Optics Letters. The echelle grating receives a multiplexed input beam containing a number of wavelengths ($\lambda_1$, $\lambda_2$, ... $\lambda_n$) representing channels in a wavelength division multiplexed optical network. There are typically 80 channels with a 50 GHz spacing although an advantage of the present monitor is that it is easily scaleable to handle greater numbers of channels.

The echelle grating 21 demultiplexes the incoming beam and focuses the demultiplexed wavelengths ($\lambda_1$, $\lambda_2$, ... $\lambda_n$) onto an array of output waveguides 23. The output of the echelle grating 21 is coupled through a slab waveguide 22 formed in glass substrate 20.

The output waveguides 23 are ridge waveguides formed by etching and lithographic techniques on the substrate 20. Alternate output waveguides 23', 23" are evenly divided into first and second split waveguide sections 23a and 23b. The alternate output divided waveguides 23', 23" are separated by regular undivided waveguides 23.

The output waveguides 23 lead to an InGaAs array detector 24 having individual sensor elements 25 receiving light from each undivided waveguide and split waveguide section.

When components in the input beam have their nominal wavelengths ($\lambda_1$, $\lambda_2$, ... $\lambda_n$), centered on the ITU grid of the telecom window, the waveguide array is positioned so that they are focused onto the midpoint of the divided waveguides. In FIG. 2, it will be seen that wavelength $\lambda_1$ is focused onto the midpoint 26 of divided waveguide 23" adjacent the leading edge 29a of waveguide divider 29. As a result the light is divided equally into first and second portions passing respectively through split waveguide sections 23a, 23b, and thus impacts the corresponds sensor elements 25a, 25b with equal intensity. This is shown by the 50:50 intensity ratio picked up by sensor elements 25a, 25b. It will of course be realized that it is not necessary for the nominal wavelength to be split 50:50 as long as the monitor is properly calibrated so that the ratio for the components in each section for each nominal wavelength is known.

In the case of wavelength $\lambda_2$ this is assumed to have drifted slightly during its propagation through the optical network, so that the actual wavelength is now $\lambda_2+\Delta\lambda$. In this case the demultiplexed wavelength will no longer be centered on the output waveguide 23' but will be slightly offset by an amount that depends on the drift $\Delta\lambda$. In this example it is assume that the drift is such that the light is split into the two sections in a ratio 80:20.

By measuring the difference in reading between pairs of sensor elements 25a, 25b, it will be seen that the monitor can be made extremely sensitive to very small amounts of drift $\Delta\lambda$. The monitor can of course measure the drift on a per-channel basis.

The intermediate sensors receive light from the intervening undivided waveguides 23. These are located at positions where they do not receive a pre-assigned ITU wavelength demultiplexed by the echelle grating 21 so the only signal generated by the sensors 25c comes from background noise 28. By comparing the added signals from the sensors 25a, 25b and comparing the sum with the signals from the intervening sensors 25c, the monitor can measure the optical signal-to-noise ratio (OSNR) of the optical network.

If desired the divided waveguides can be omitted and replaced by undivided waveguides. In this case, the monitor is no longer able to measure wavelength drift, but it can still measure channel power and OSNR. The use of the echelle grating 21 is desirable because it makes the monitor easily scaleable using monolithic technology. However, AWG systems could also be used for coarser systems.

In the case of an 80-channel device the described monitor can conveniently use a 256-channel InAsGa array. 160 sensor elements are required for the 80 channels, two for each waveguide, and 79 elements are required for insertion between the divided waveguides (This leaves 17 unused sensor elements). This is a considerable advantage when it is recognized that the cost of a 512-element array required by most prior art systems is about four times the cost of a 256-element array.

Signal processing is simplified since the wavelength of each channel is measured optically instead of electrically. Signal processing can be carried out using conventional DSP techniques. The use of an echelle grating gives much better resolution than was previously thought possible. The module can also be made smaller.

Figures 3A, 3B:
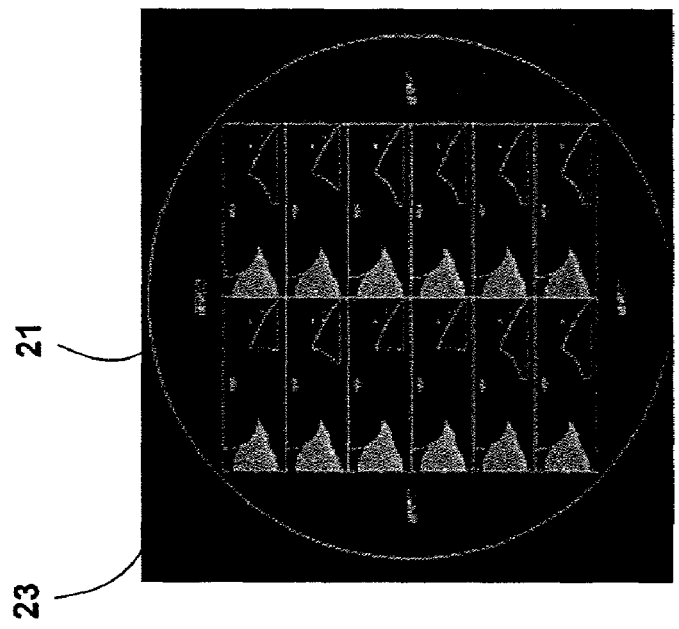
FIGS. 3A and 3B are plan views of the spectrometer demultiplexer showing the constructional details.

FIGS. 3A and 3B shows the method of construction of the spectrometer for the performance monitor. The echelle grating 21 and output waveguide array are formed monolithically on the glass substrate 20 by etching and lithographic techniques. The echelle grating 21 is associated with a prism compensator region 30 as described in copending application entitled Method for Polarization Birefringence Compensation in a Waveguide Demultiplexer using a Compensator with a High Refractive Index Capping Layer", the contents of which are herein incorporated by reference.

The input beam is directed at the echelle grating 21 by input waveguide 27 formed as ridge waveguide on substrate 20. FIG. 3B shows a 12-wafer die.

The performance of a monitor constructed in accordance with the invention was compared with various commercial prior art devices. The performance and characteristics are set forth in the following table.

| | |
|---|---|
| Wavelength Range (nm) | 5, C, L or 1.3 μm band |
| Spectral Resolution (pm) | 10 |
| Absolute Wavelength Accuracy (+/−)(pm) | 15 |
| Dynamic Range (dB) | 60 |
| Absolute Power Accuracy (+/−)(dB) | 0.5 |
| Power Range (dBm) | −60 to 0 |
| OSNR (dB, @50 GHz) | 25 |
| Polarization Dependence (dB) | 0.2 |
| Scan time (s) | <1 |
| Power Consumption (W) | 5 |
| Electronics Interface | Serial & Parallel |
| Detectors | 256 InGaAs array |
| Dimensions (mm) | 90 × 60 × 22 |

The optical performance monitor is capable of remote monitoring of power, wavelength, and OSNR for up to 80 channels and offers on-board signal processing. It is remotely upgradeable and can be made to be of very small size. It incorporates a high resolution demux, full detector array and signal processor.

Although the invention has been described and illustrated in detail, it is clearly understood that the same is by way of illustration and example only and is not to be taken by way of limitation, the spirit and scope of the present invention being limited only by the terms of the appended claims.

The invention claimed is:

1. An optical performance monitor for measuring the performance of optical networks, comprising:

a demultiplexer for demultiplexing an input beam into a plurality of wavelength channels;

an array of divided output waveguides, each divided output waveguide positioned to receive a corresponding demultiplexed wavelength channel from said demultiplexer, and each divided output waveguide laterally separating said corresponding demultiplexed wavelength into a first portion and a second portion;

an undivided output waveguide between adjacent pairs of divided output waveguides, positioned to receive background noise signals having wavelengths between said demultiplexed wavelength channels; and a detector array having sensor elements positioned to receive said respective first and second portions of said demultiplexed wavelength channels and said background noise signals for comparing the intensity of radiation received by said divided output waveguides with the intensity of said noise signal to determine a signal-to-noise ratio for each of said demultiplexed wavelength channels.

2. An optical performance monitor as claimed in claim 1, wherein said demultiplexer is an echelle grating.

3. An optical performance monitor for measuring the performance of optical networks, comprising:

a planar waveguide demultiplexer for demultiplexing an input beam into a plurality of wavelength channels having their nominal wavelengths centered on an ITU grid;

an array of divided output waveguides, each divided output waveguide including:
  an opening positioned to receive a corresponding demultiplexed wavelength channel from said demultiplexer,
  a waveguide divider therein forming first and second split waveguide sections for laterally separating said corresponding demultiplexed wavelength channel into a first portion and a second portion; and
  a pair of exits for outputting the first and second portions of respective wavelength channels;

a slab waveguide coupling said output waveguides to said planar waveguide demultiplexer;

a detector array having sensor elements positioned to receive said respective first and second portions of said demultiplexed wavelength channels; and monitoring means for measuring drift for each wavelength channel by comparing measurements of the first and second portions for each wavelength channel from the array of detectors with predetermined nominal measurements.

4. The optical performance monitor as claimed in claim 3, further comprising an undivided output waveguide between adjacent pairs of divided output waveguides, said undivided output waveguides being positioned so as to receive background noise signals having wavelengths between said demultiplexed wavelength channels.

5. The optical performance monitor as claimed in claim 2, wherein said echelle grating is a Rowland grating, said demultiplexed wavelength channels being focused onto said divided output waveguides.

6. An optical performance monitor as claimed in claim 5, wherein said echelle grating is a blazed grating.

7. An optical performance monitor as claimed in claim 5, wherein said detector array is an InGaAs array.

8. An optical performance monitor as claimed in claim 1, wherein said output waveguides are ridge waveguides and are coupled to said echelle grating by a slab waveguide.

9. An optical performance monitor as claimed in claim 8, further comprising a thermoelectric cooler and temperature sensor to maintain the temperature of said monitor at a nominal value.

10. An optical performance monitor as claimed in claim 1, wherein said divided output waveguides are positioned such that when light having a nominal channel wavelength is directed onto said divided output waveguides, said light is divided substantially equally into said first and second portions.

11. A method of monitoring the performance of an optical network, comprising the steps of:

demultiplexing an input beam into a plurality of wavelength channels having their nominal wavelengths centered on an ITU grid;

receiving said demultiplexed wavelength channels in respective openings of divided output waveguides, providing a waveguide divider in each output waveguide, which divides each output waveguide into first and second split waveguide sections, for separating each of said demultiplexed wavelength channels into first and second laterally spaced portions; and detecting the relative intensity of said first and second laterally spaced portions to determine the drift of said demultiplexed wavelengths from nominal values.

12. A method as claimed in claim 11, wherein said plurality of wavelengths are demultiplexed with an echelon grating.

13. The method as claimed in claim 11, wherein said demultiplexed wavelength channels are directed onto a mid-point of said divided output waveguides so that the nominal intensity of said first and second laterally spaced portions is substantially the same.

14. The method as claimed in claim 11, wherein said input beam is demultiplexed with a Rowland echelle grating, which focuses said demultiplexed wavelength channels onto said divided output waveguides.

15. A method as claimed in claim 11, further comprising detecting background radiation at wavelengths corresponding to positions between said divided output waveguides, and comparing the intensity of radiation received by said divided output waveguides with background radiation to determine a signal-to-noise ratio for said demultiplexed wavelength channels.

16. A method as claimed in claim 11, further comprising demultiplexing a background noise signal having wavelengths between said wavelength channels;

receiving said demultiplexed background noise signal in an opening of an undivided output waveguide; and detecting the intensity of said noise signal; and comparing the intensity of radiation received by said divided output waveguides with the intensity of said noise signal to determine a signal-to-noise ratio for each of said demultiplexed wavelength channels.

17. The optical performance monitor as claimed in claim 4, further comprising:

additional detectors for measuring the background noise signals; and monitoring means for determining an optical signal-to-noise ratio of the wavelength channels by comparing measurements of the first and second portions to the background noise signal.

18. The optical performance monitor as claimed in claim 1, further comprising monitoring means for measuring drift for each wavelength channel by comparing measurements of the first and second portions for each wavelength channel from the array of detectors with predetermined nominal measurements.

19. The optical performance monitor as claimed in claim 1, further comprising:

monitoring means for determining an optical signal-to-noise ratio of the wavelength channels by comparing measurements of the first and second portions to the background noise signal.

* * * * *